(12) United States Patent
Volker et al.

(10) Patent No.: US 6,244,425 B1
(45) Date of Patent: Jun. 12, 2001

(54) CONVEYOR TROLLEY SYSTEM

(76) Inventors: Todd A. Volker, 14808 Outlook, Overland Park, KS (US) 66223; C. Donald Comley, 7706 NW. 74th St., Kansas City, MO (US) 64152

( * ) Notice: Subject to any disclaimer, the term of this patent is extended or adjusted under 35 U.S.C. 154(b) by 0 days.

(21) Appl. No.: 09/412,286

(22) Filed: Oct. 5, 1999

Related U.S. Application Data

(60) Provisional application No. 60/103,332, filed on Oct. 7, 1998.

(51) Int. Cl.[7] .................................................... B65G 17/32
(52) U.S. Cl. ........................... 198/686; 452/177; 452/187
(58) Field of Search .................................... 198/686, 177; 452/187

(56) References Cited

U.S. PATENT DOCUMENTS

| | | |
|---|---|---|
| 543,319 | 8/1895 | Van Duzer et al. . |
| 762,517 | 6/1904 | Duncan . |
| 1,247,535 | 11/1917 | Huddleston . |
| 1,447,219 | 3/1923 | McBride . |
| 1,672,799 | 6/1928 | Benner . |
| 2,073,131 | 3/1937 | Webb . |
| 2,344,829 | 3/1944 | McAvoy . |
| 2,604,974 | 7/1952 | Daigle . |
| 2,759,592 | 8/1956 | Daigle . |
| 2,830,694 | 4/1958 | Zebarth . |
| 2,896,772 * | 7/1959 | Daigle .................................. 198/686 |
| 3,012,518 | 12/1961 | Sawyer et al. . |
| 3,018,738 | 1/1962 | Naud . |
| 3,051,011 * | 8/1962 | Zebley .................................. 198/686 |
| 3,094,943 | 6/1963 | Parker et al. . |
| 3,103,896 | 9/1963 | Zebley et al. . |
| 3,139,175 | 6/1964 | Wells . |
| 3,221,866 | 12/1965 | Nash . |
| 3,627,595 | 12/1971 | Leach . |
| 3,672,306 | 6/1972 | Dehne et al. . |
| 3,934,517 | 1/1976 | Hirsig . |
| 4,395,068 | 7/1983 | Simmons et al. . |
| 5,113,768 | 5/1992 | Brown . |
| 5,363,770 | 11/1994 | Makimura et al. . |

* cited by examiner

*Primary Examiner*—Christopher P. Ellis
*Assistant Examiner*—Joe Dillon, Jr.
(74) *Attorney, Agent, or Firm*—Chase & Yakimo, L.C.

(57) ABSTRACT

A trolley unit for a conveyor system comprises first and second releasably engageable trolley half sections. First and second shafts extend from one of said trolley sections and through the other trolley section to provide a pivot axis for an end of upstream and downstream trolley connecting cables. A third shaft provides a support bar for a load attachment hanger. Upon releasable attachment of the trolley halves an integral trolley unit with central housing houses the pivot shafts with the cables extending therefrom. The integral trolley unit is easily dismantled allowing for easy maintenance. A turn sheave includes a cable seat and plurality of trolley seats which inhibit inward deflection of the seated cables and trolleys when the trolleys are moving about a corner of the conveyor system as defined by a change in a horizontal direction of the support rail.

11 Claims, 8 Drawing Sheets

CONVEYOR TROLLEY SYSTEM

CROSS-REFERENCE TO RELATED APPLICATION

This application claims the benefit of the prior filed, co-pending application Ser. No. 60/103,332, filed Oct. 7, 1998, entitled CONVEYOR TROLLEY SYSTEM.

BACKGROUND OF THE INVENTION

This invention relates to the conveying of products via an overhead trolley type conveyor in a meat/food processing facility.

In a meat/food processing facility it is desirable to control the hygiene of the processing environment so as to preclude the introduction of contaminates in the product. Various government regulations address contaminates and sanitation in meat/food processing facilities. It is also desirable to maintain and/or modify conveyor systems with a minimum of effort to reduce labor and costs. Furthermore it is desirable to maintain safe conveyor systems to avoid injury to personnel and equipment.

Several problems exist that hinder the meat/food processing facility in meeting the government regulations concerning hygiene, maintenance and the safety of this equipment.

One problem is the result of sanitation techniques used on the conveyor systems. These systems are sprayed or dipped in a sanitation solution that may become trapped in recesses or between components. Current conveyor systems, by design, have a significant number of areas to trap contaminates. This results in possible contamination due to dripping of solution onto product throughout the facility. If product is contaminated it must be removed from the production stream and destroyed or utilized as rendering at a greatly reduced value.

A second source of contamination is the direct result of normal wear in current metallic based trolley systems. Metal flakes, corrosion, lubricants, and broken cable strands can find their way into the meat/food products during the normal operation of these systems as they pass over areas containing product.

Current systems are plagued with endless cycles of sanitation. Corrosion is accelerated by the use of strong caustic sanitation solutions. Corroded parts making contact with other metal parts tend to wear faster than normal.

Failure of an overhead trolley conveyor system is potentially dangerous due to unexpected rapid and uncontrolled movement of product on the conveyor system. Many components of current systems utilize plated mild steel, which corrodes rapidly when exposed to caustic sanitation solutions. Those systems utilizing corrosive resistant cable do not address the problem of stress on the cable mounting points resulting in premature fracturing of the cable strands. These systems are hard to inspect resulting in overlooked damage and unrecognized danger. Because these systems utilize metal to metal engagement of components they must also use lubricants. The lubricants are constantly depleted during the sanitation process and pose a contamination threat themselves.

Maintenance costs of current conveyor systems are significant due to the need for constant lubrication, replacement of parts that show excessive wear, corrosion, and fracturing. Modification and repair of current systems must be performed at designated areas away from meat/food products. Current systems utilized complex trolleys with multiple components fastened together. Replacing trolley components can require more multiple maintenance personnel to perform the repair. Current Systems typically use continuous lengths of cable or chain for an entire system. Often, cutting equipment and special power tools are required to repair or modify the conveyors. This results in additional loss of use and increased costs. If a current conveyer system should fail, the system must be advanced to a safe area for repair. If this is not possible then product must be removed from the work area to avoid contamination. This procedure and subsequent cleanup of the work area increases costs substantially.

Finally, current systems create noise due to metal to metal contact. This adds to the overall ambient noise level that could be detrimental to the work force.

SUMMARY OF THE INVENTION

In response thereto we have invented an improved conveyor trolley system which eliminates or reduces the potential of product contamination in a meat/food processing facility while minimizing maintenance, modification costs, and noise. Our system utilizes a combination of polymer-based materials and corrosive resistant steel formed into a series of trolleys connected by individual cable sections. These components are supported vertically by commercially available wheels rolling along a system of commercial tee rails. The conveyor is able to transport products to any point within the facility along the conveyor path utilizing trolley hanger attachments as designated by the user. Our system utilizes specially designed turn sheave assemblies to drive the system along the tee rails and support the trolley hanger components as they change horizontal directions during normal travel along the conveyor path. The precision design of the trolley hangers and turn sheave assemblies allows them to work together and minimize all stress and wear associated with changing directions. The combination of the design and the materials used to make the trolley hangers and turn sheaves make them very quiet. The specially designed cable end fitting working in conjunction with the trolley hanger attachment point will allow an extreme angle of deflection with no detrimental stress placed on the cable or cable end fitting. This results in an extremely flexible and long lasting system. Lubrication is eliminated with the use of polymer-based materials and the design of the cable end fitting and the trolley hanger attachment points. Our system may be repaired or modified at almost any point in the system using only common hand tools.

It is therefore the objective of this invention to present an improved trolley conveyer system to minimize the contamination of meat/food products in a processing facility, reduce the overall cost of maintenance, and improve safety.

The object of the polymer-base trolley hangers is to eliminate harmful corrosion.

Another object is to eliminate areas capable of trapping contaminating fluids.

Further object of the polymer-based trolley hangers is to minimize noise.

Further object of the polymer-based trolley hangers is to reduce wear.

The object of the polymer-based turn sheaves is to form sheave turn assemblies and work in conjunction with the polymer-based trolley hangers to provide smooth propulsion and horizontal transition for the conveyor system through the turns.

Another object of the polymer-based turn sheaves is to support the trolley hangers and remove detrimental stress from the cable and cable end fittings.

Further object of the polymer-based turn sheaves is to eliminate corrosion.

Further object of the polymer-based turn sheaves is to eliminate areas capable of trapping contaminating fluids.

Further object of the polymer-based turn sheaves is to minimize noise.

Further object of the polymer-based turn sheaves is to minimize wear between the trolley hangers and the turn sheaves.

Another object of this invention is to eliminate the need for lubrication of the conveyer system.

Another object of this invention is to reduce the maintenance costs of the conveyor system.

Another object of this invention is to improve the ability to modify the conveyor system.

Another object of this invention is to improve inspection capabilities and avoid dangerous failures.

Another object of this invention is to eliminate stresses that tend to fracture the cables in the system.

Another object of this invention is to provide the capability of rapid replacement of worn or damaged parts at convenient locations.

Other advantages of this invention will become apparent from the following description taken in connection with the accompanying drawings, wherein is set forth by way of illustration and example, an embodiment of this invention.

DESCRIPTION OF PREFERRED EMBODIMENT

Figure 1:
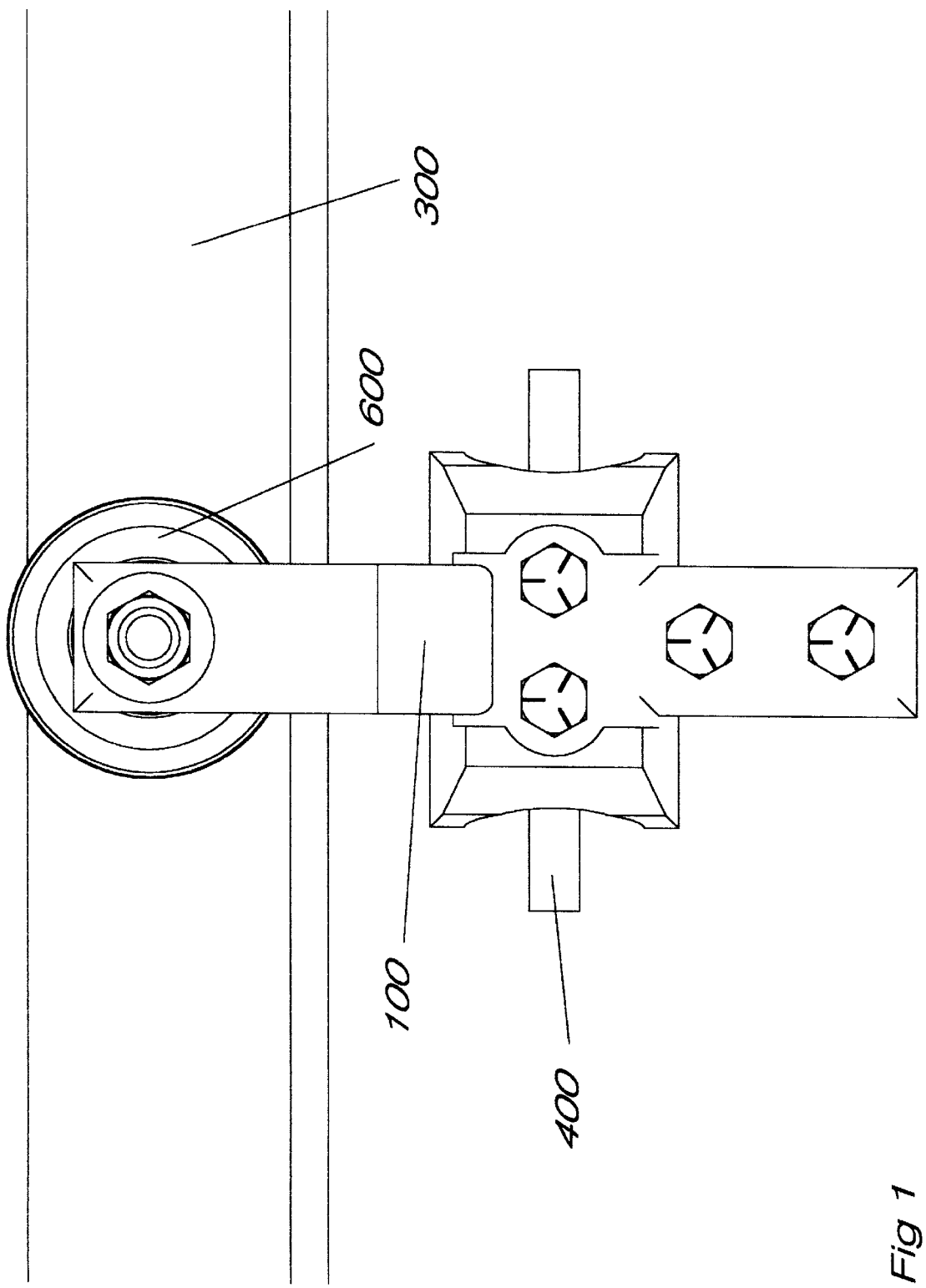
FIG. 1 is a side view of the trolley hanger with cable end fittings as it travels along a commercial support tee rail.
Figure 2:
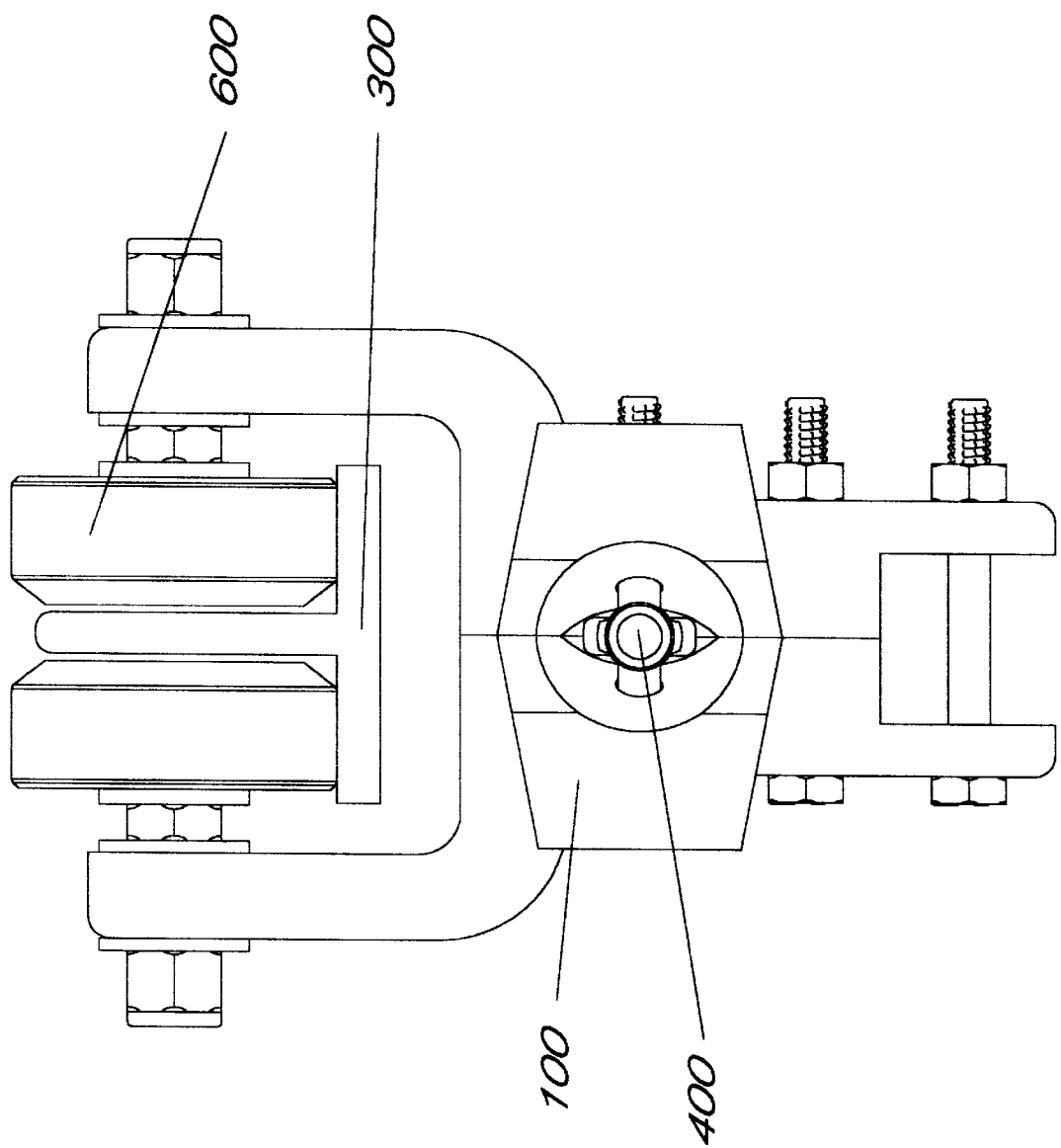
FIG. 2 is a front view of a trolley hanger with cable end fittings as it travels along a commercial support tee rail.
Figure 3:
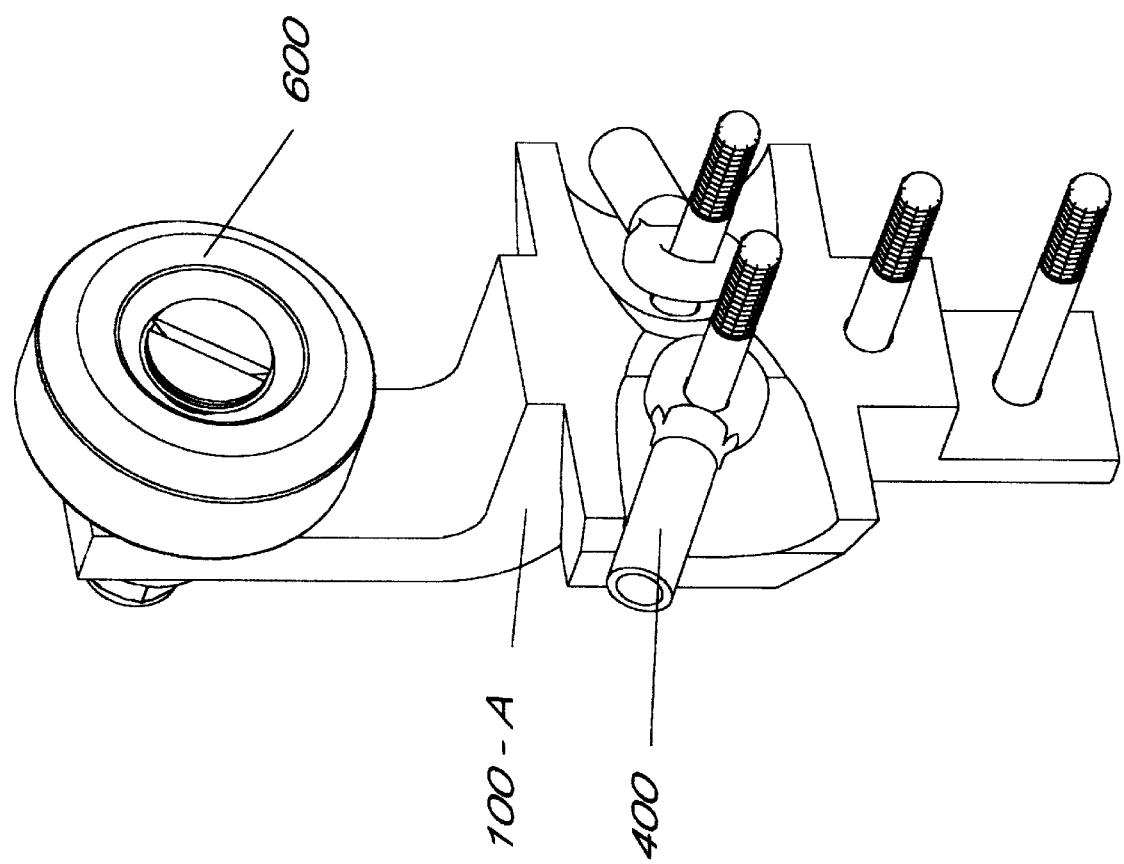
FIG. 3 is a cutaway view of a trolley hanger illustrating the internal geometry and angle deflection capabilities of the cable end fittings.
Figure 4:
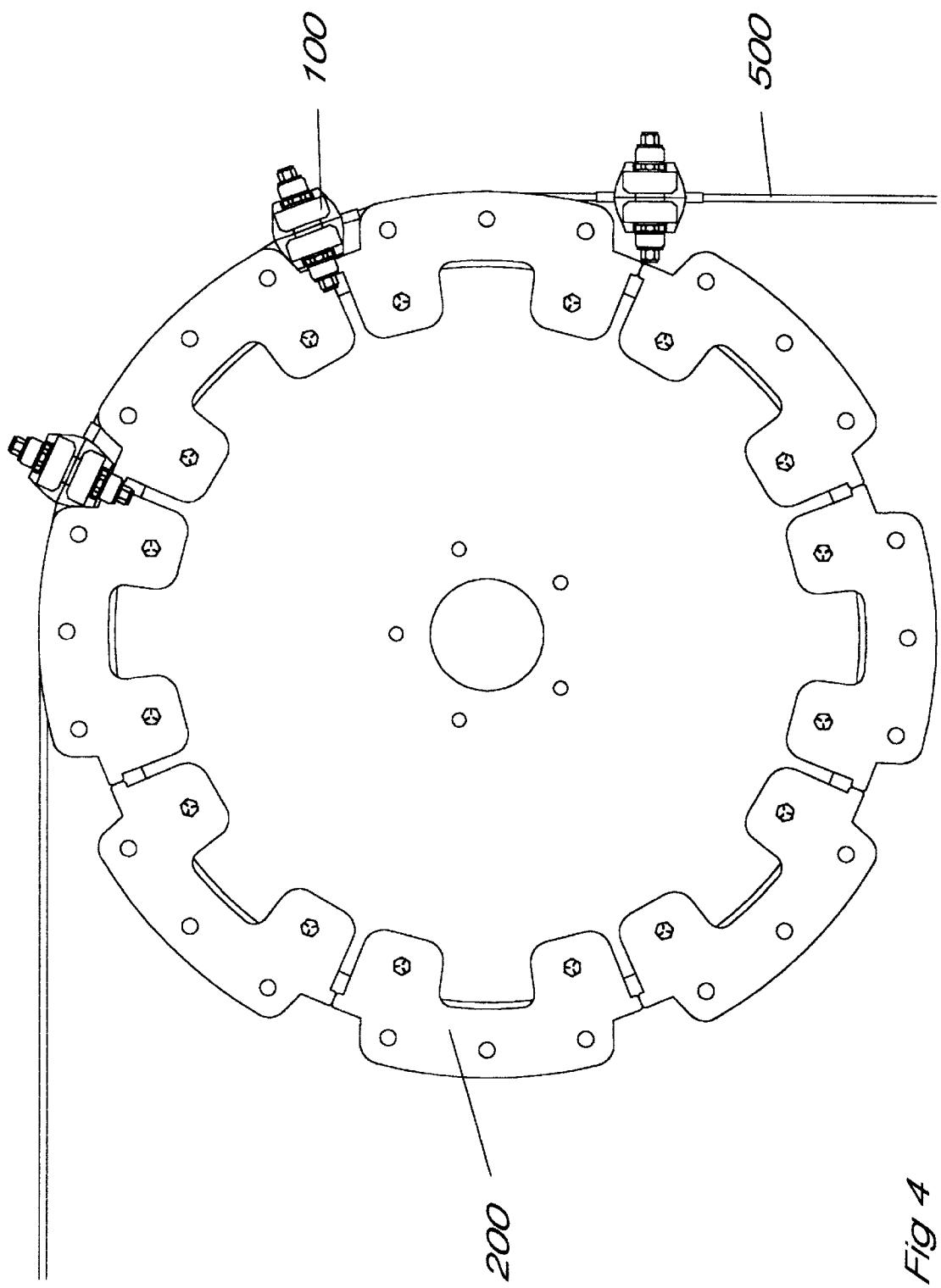
FIG. 4 is a top view of a turn sheave assembly showing the interaction of the trolley hangers as they pass around a horizontal turn.
Figure 5:
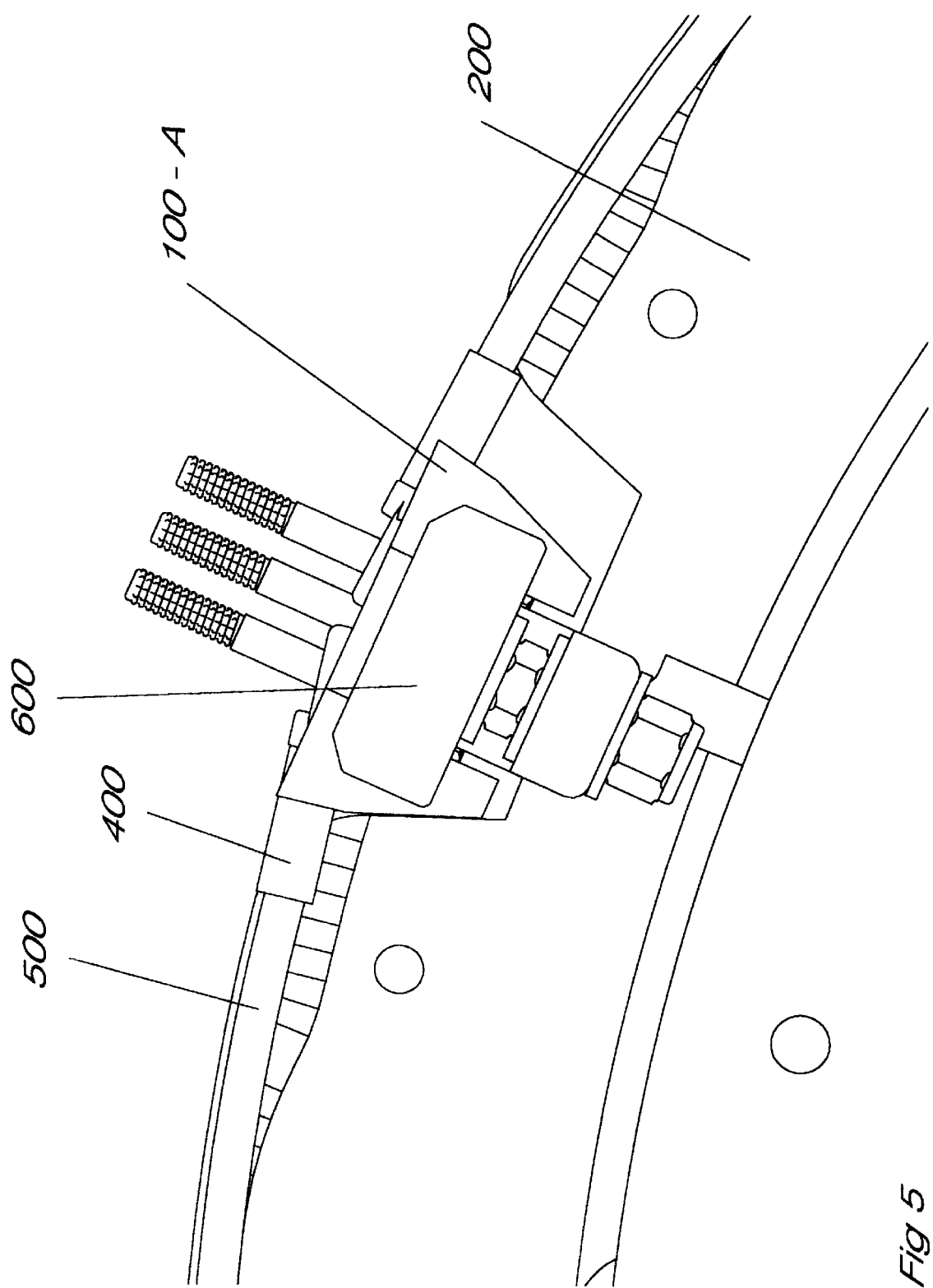
FIG. 5 is a cutaway of a turn sheave assembly showing how the trolley hanger and cable assemblies are supported with minimal stress.
Figure 6:
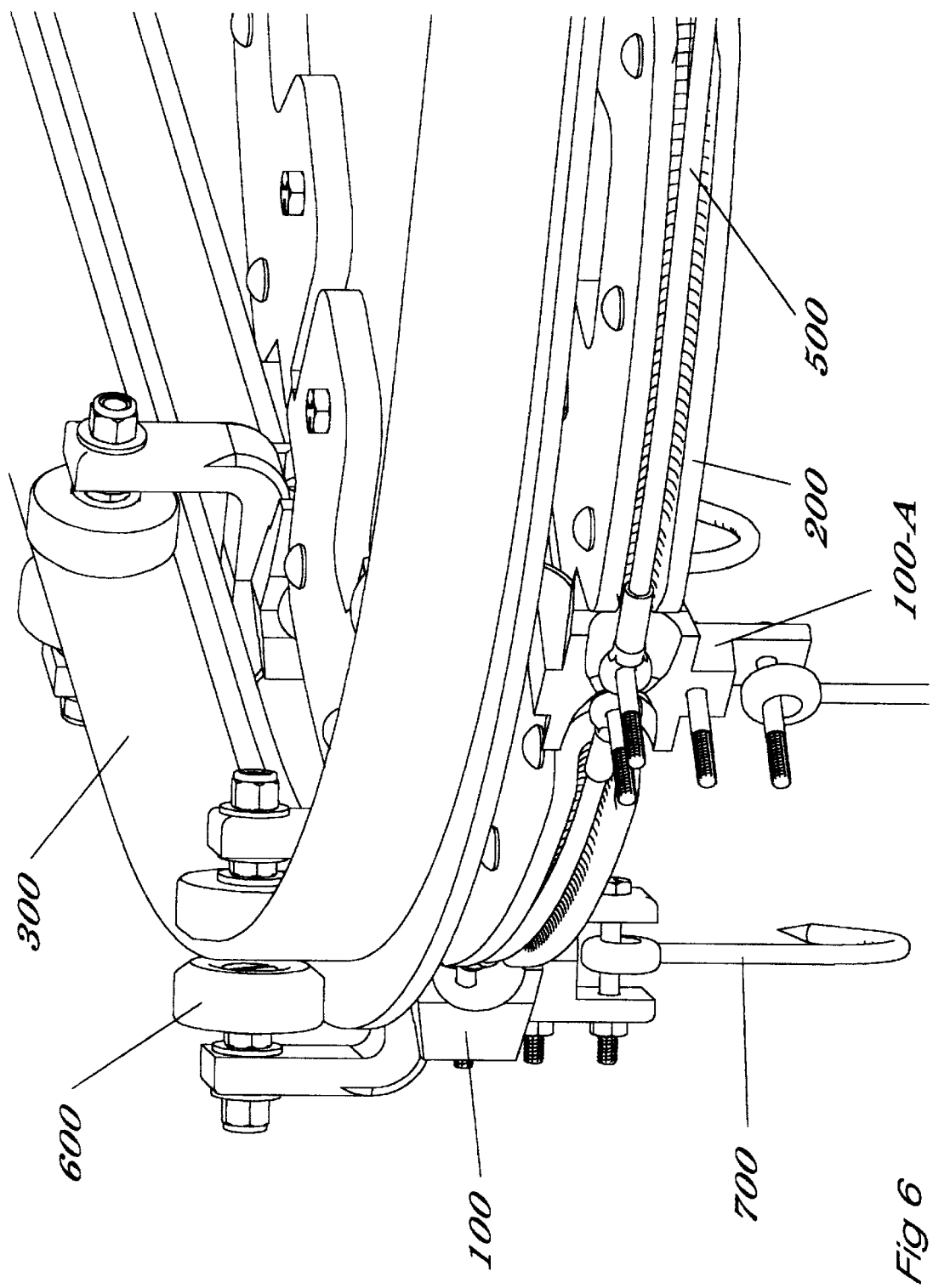
FIG. 6 is an isometric view of the cable assemblies, trolley hangers with user-supplied attachments, and turn sheave assemblies making a horizontal turn under a commercial tee rail.
Figure 7:
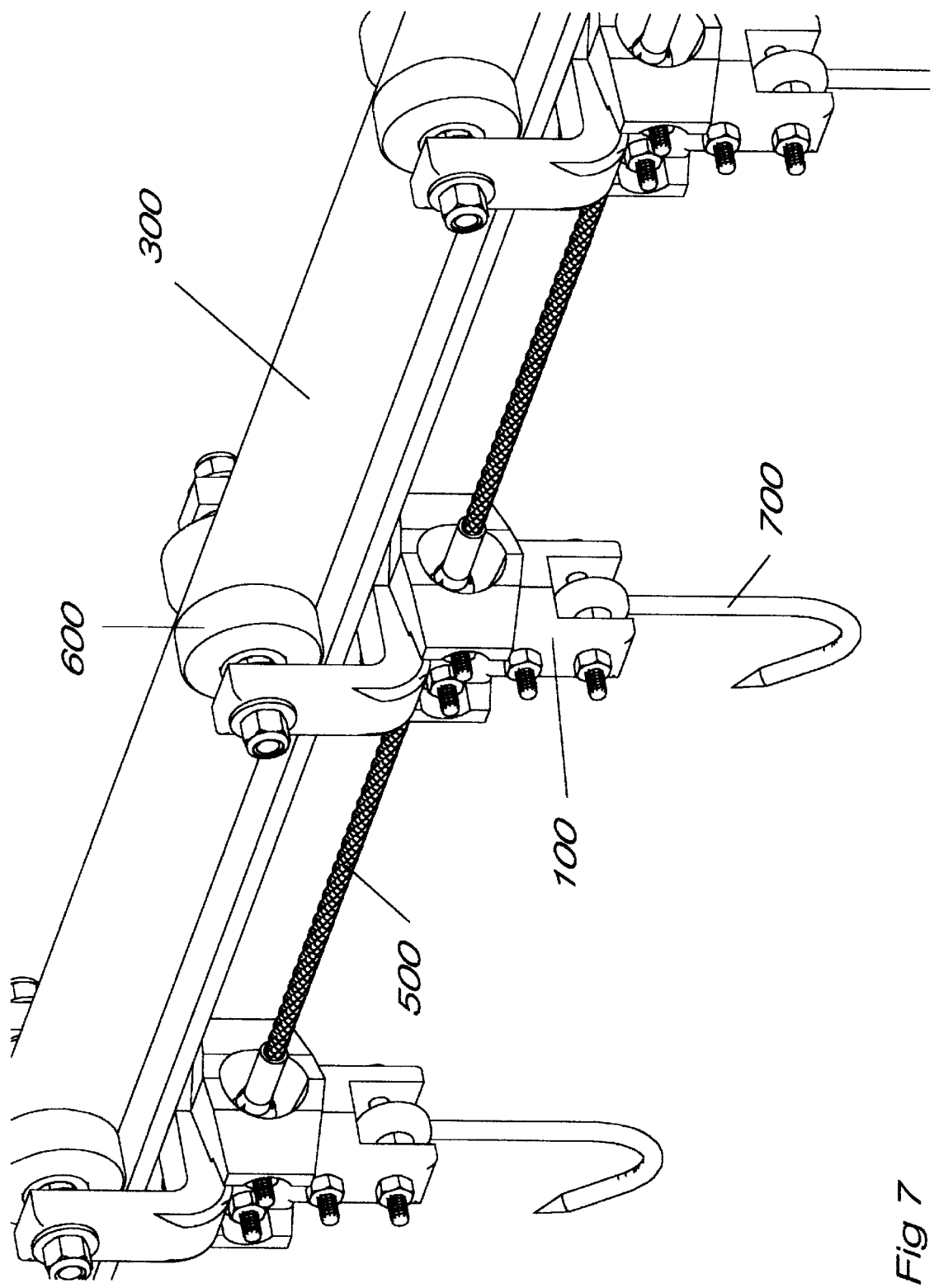
FIG. 7 is an isometric view of a series of trolley hangers connected by cable assemblies traveling along a commercial tee rail with user supplied hanger attachments.
Figure 8:
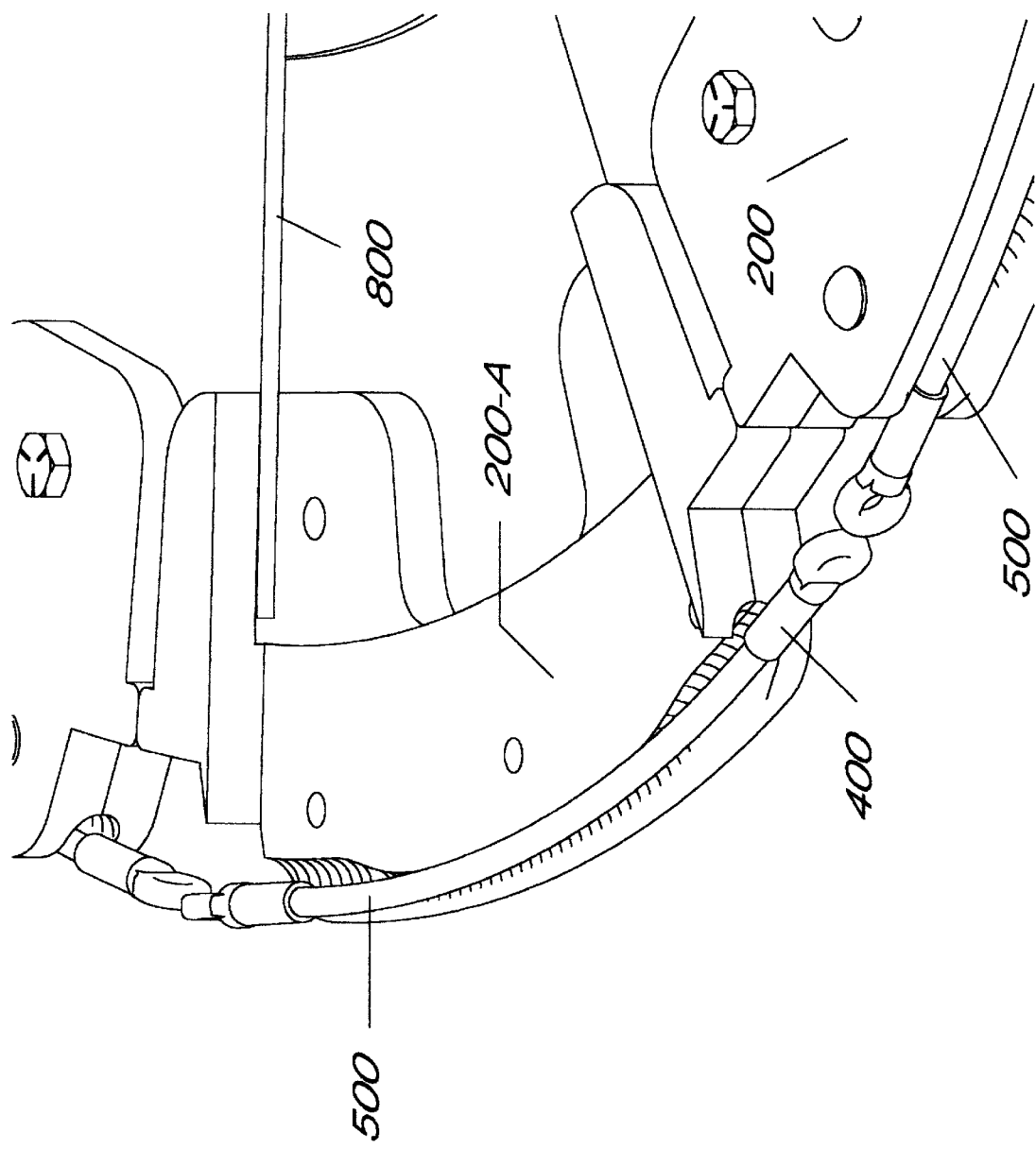
FIG. 8 is an isometric cut away view of a sheave turn assembly showing the geometry of the sheave assembly and the interaction of the cable assembly end fittings.

Referring to the drawings, FIGS. 1–8 show an improved trolley conveyor system comprised of components designed to work in conjunction with each other and address specific problems in the meat/food processing industry. This system represents an easily installed, low maintenance trolley conveyor with exceptional sanitation properties. This improved conveyor system utilizes trolley hangers 100 (FIGS. 1,2) designed to eliminate contamination of meat/food products through the use of selected materials and geometrical shapes. Trolley hangar halves are bolted together to form trolley hangers 100 which are coupled to commercial tee rails 300 though the use of commercial rollers 600. The trolley hangers 100 form the portion of the conveyor that supports the weight of the product during travel. User specific attachments can be mounted on the trolley hangers utilizing the bottom bolt FIGS. 2 & 3). Cable assemblies 500 (FIG. 7) connect multiple trolley hangers 100 to achieve the desired length for the cable system. Cable assemblies 500 are composed of a length of cable with a cable end fitting 400 (FIG. 8) attached to each end. The cable end fittings 400 attach to pivot points on trolley hangers 100 (FIG. 3). This design will allow the cable assemblies 500 to pivot, as necessary, between trolley hangers 100 as they travel along the supporting tee rail 300. Allowing the cable assemblies to pivot as illustrated in FIG. 3 eliminates virtually all side stress on the cable assemblies 500. Detrimental stress is further reduced by using specially designed turn sheaves 200 bolted to a center hub 800 to form a turn sheave assembly which supports the trolley hangers 100 and cable assemblies 500 during a horizontal turn. The turn sheaves 200 are designed to work in conjunction with the trolley hangers 100 to restrict the depth of the trolley hanger 100 penetration between the sheaves 200 (FIGS. 4 & 6). The turn sheaves 200 are also designed to support the cable assembly 500 during a turn without placing force directly on the cable end fitting 400 or the pivot point of the trolley hanger 100 (FIG. 5). This insures the cable assembly 500 is never forced out of the designed pivot range or flexed detrimentally. A turn sheave assembly may also assume the function of transmitting drive propulsion to the conveyor system. Safety and reliability are improved because the trolley hangers 100, turn sheaves 200, and cable assemblies 500 work together to reduce deterioration from stress. If repairs become necessary, the components may be replaced at almost any location along the conveyor system. Each cable assembly 500 may be replaced by removing one pivot point mounting bolt at each end using common hand wrenches (FIG. 3). This technique has an added benefit over current systems by leaving the trolley hanger 100 intact on the tee rail 300. Trolley hanger halves may be replaced by simply removing four bolts with common hand wrenches. The entire conveyor system requires no lubrication due to the use of selected materials and design flexibility thus eliminating one final source of potential contamination.

It can be appreciated that this improved trolley conveyor system represents significant advantages for the meat/food processing industry. Accordingly, the minimization of contamination insures a safer supply of meat/food to consumers while improved reliability and safety enhance the environment for meat/food processing workers.

Having thus described the invention, what is claimed as new and desired to be secured by Letters Patent is:

1. A trolley hanger assembly adapted for suspension from a support rail comprising:

first and second bipartite trolley bodies presenting an integral trolley unit upon joinder therebetween;

means for providing rolling movement of said trolley unit along said support rail;

a first shaft extending from one of said trolley bodies and through the other of said trolley bodies, said first shaft adapted to provide a pivot axis for an end of a downstream trolley connecting cable;

a second shaft extending from one of said trolley bodies and through the other of said trolley bodies, said second shaft adapted to provide a pivot axis for an end of an upstream trolley connecting cable;

means for releasably connecting said ends of said upstream and downstream cables to said respective first or second shafts;

a third shaft extending from one of said trolley bodies and through the other of said trolley bodies, said third shaft adapted to suspend a load supporting attachment therefrom;

means for releasably attaching said first trolley body to said second trolley body to present said joinder.

2. The assembly as claimed in claim 1 wherein said releasably attaching means comprises a fastener engaging a free end of each said shaft subsequent to said joinder.

3. The assembly as claimed in claim 1 wherein each of said cable ends are slidable along said respective shaft.

4. The assembly as claimed in claim 1 wherein said cable connecting means attaches said cable ends to said respective shafts prior to said joinder.

5. The assembly as claimed in claim 4 wherein said cable connecting means comprises a fitting at an end of each cable for extension of said first or second shafts therethrough prior to said joinder.

6. A trolley hanger assembly for suspension from a support rail comprising:

first and second trolley bodies;

a roller arm in each trolley body for suspension below the support rail;

a roller mounted to each roller arm, said roller adapted for rolling movement along the support rail;

a housing at a lower end of each said roller arm;

a first shaft with a free end extending from one of said housings and through the other of said housings, said first shaft adapted to provide a pivot axis for an end of a downstream trolley connecting cable;

a second shaft with a free end extending from one of said housings and through the other of said housings, said second shaft adapted to provide a pivot axis for an end of an upstream trolley connecting cable;

a third shaft with a free end extending from one of said housings and through the other of said housings, said third shaft adapted to suspend a load supporting attachment therefrom;

means for releasably attaching said first trolley body to said second trolley body to present an integral trolley unit with said first and second rollers adapted to move along a surface of the rail and an integral shaft housing having said first and second shafts therein with the upstream and downstream cables adapted to respectively extend from said shaft housing in respective pivotable movement about said first and second shafts, said third shaft below said integral shaft housing for suspending a load supporting attachment therefrom.

7. The assembly as claimed in claim 1 wherein said releasable attaching means comprises a fastener engaging a free end of each of said shafts upon said extension through the other of said housings, whereby to maintain said respective extension of each shaft through said housing.

8. The assembly as claimed in claim 1 wherein each of said cable ends are slidable along said respective shaft.

9. The assembly as claimed in claim 1 wherein said housing presents first and second openings whereby to present apertures for extension of said cables therefrom upon said releasable attaching of said first trolley body to said second trolley body.

10. The assembly as claimed in claim 1 wherein each of said cables include means for releasably connecting said respective cables to said respective first and second shafts.

11. The assembly as claimed in claim 2 wherein said connecting means include a fitting at an end of each cable for extension of said respective first or second shafts therethrough, each said fitting maintained on said respective shaft upon said attaching of said trolley bodies.

* * * * *